(12) United States Patent
Ueda et al.

(10) Patent No.: US 7,837,563 B2
(45) Date of Patent: Nov. 23, 2010

(54) POWER TRANSMISSION DEVICE

(75) Inventors: Motohiko Ueda, Okazaki (JP); Hiroki Ishii, Nishio (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 494 days.

(21) Appl. No.: 11/902,498

(22) Filed: Sep. 21, 2007

(65) Prior Publication Data

US 2008/0076583 A1    Mar. 27, 2008

(30) Foreign Application Priority Data

Sep. 26, 2006   (JP) ............................. 2006-260535

(51) Int. Cl.
*F16D 7/02* (2006.01)
(52) U.S. Cl. .......................................... 464/45; 464/42
(58) Field of Classification Search ................... 464/30, 464/42, 45; 474/70, 903
See application file for complete search history.

(56) References Cited

U.S. PATENT DOCUMENTS

| | | | |
|---|---|---|---|
| 5,482,128 A | * | 1/1996 | Takaoka et al. ........... 464/42 X |
| 7,066,819 B2 | | 6/2006 | Ueda et al. |
| 7,121,947 B2 | | 10/2006 | Ueda et al. |
| 2003/0130044 A1 | | 7/2003 | Kanai et al. |

FOREIGN PATENT DOCUMENTS

| | | | | |
|---|---|---|---|---|
| IT | 345954 | * | 6/1937 | ................... 464/45 |
| JP | A-2003-206950 | | 7/2003 | |
| JP | A-2003-307265 | | 10/2003 | |

\* cited by examiner

*Primary Examiner*—Greg Binda
(74) *Attorney, Agent, or Firm*—Posz Law Group, PLC

(57) ABSTRACT

In a power transmission device 41, a tapered inner circumferential surface 79 increasing its diameter toward a rotating shaft body 47 is formed in a hub 75, and a tapered outer circumferential surface 83 increasing its diameter toward the rotating shaft body 47 is formed in a tubular member 81 and press-fitted to the tapered inner circumferential surface of the hub 75 so that, when an excessive load is applied between a rotating body 45 and a pulley 69, the hub 75 rotates with respect to the rotating shaft 45 and the tubular member 81 is withdrawn from the tapered inner circumferential surface 77 of the hub 75 and power transmission between the rotating shaft 45 and the pulley 69 is interrupted. Therefore, variation of working torque can be reduced.

9 Claims, 8 Drawing Sheets

POWER TRANSMISSION DEVICE

BACKGROUND OF THE INVENTION

1. Field of the Invention

The present invention relates to a power transmission device that transmits power when a normal load is applied and interrupts the power transmission when an excessive load is applied.

2. Description of the Related Art

In a compressor for an automobile air conditioner, to which power is typically transmitted from an external power source, such as an engine, etc., via a belt, if the compressor seizes up, excessive torque load may occur and damage the engine, etc. Therefore, in order to interrupt the power transmission in such case, a power transmission device having a torque limiter is used.

FIG. 8 shows a power transmission device 11 as described above that has: a belt pulley 13 around which a belt and the like is wound; a hub 15 that is fitted and secured to this belt pulley 13 via an elastic member; a power interruption member 17 that is inserted and secured inside this hub 15; and a rotating shaft 19 that is screwed inside this power interruption member 17.

The rotating shaft 19 has: a rotating shaft body 21; a right hand male thread section 23 that is provided at a tip of this rotating shaft body 21 which has a diameter smaller than that of the rotating shaft body 21; and a stepped surface 25 that is formed between this male thread section 23 and the rotating shaft body 21.

The hub 15 has a contact surface 27 thereinside that makes contact with the rotating shaft body 21 via the stepped surface 25 and a washer 35.

The power interruption member 17 has: an interruption member body 29 that is secured to the hub 15; a tubular member 31 that is screwed to the male thread section 23 of the rotating shaft 19; and a narrow diameter section 33 that integrally couples this tubular member 31 with the interruption member body 29. Here, reference numeral 37 denotes a compressor that is driven by the rotating shaft 19.

In the power transmission device 11 described above, when a normal load is applied between the belt pulley 13 and the rotating shaft 19, due to the fact that the female thread section of the power interruption member and the male thread section of the rotating shaft 19 are screwed to each other, the contact surface 27 of the hub 15 is pressed against the stepped surface 25 of the rotating shaft 19 via the washer 35. This pressing force allows the hub 15 to be connected with the rotating shaft 19 in a static friction state, so that a driving force of the belt pulley 13 is transmitted to the rotating shaft 19 to drive the compressor.

During operation under a normal load, when the rotating shaft 19 is locked due to seize-up of the compressor and the like, this impact allows the static friction state to turn into a dynamic friction state, so that the contact surface 27 of the hub 15 rotates with respect to the stepped section 25 of the rotating shaft 19. Due to this rotation, the tubular member 31 of the power interruption member 17 also rotates with respect to the male thread section 23 of the rotating shaft 19, and as a result, the tubular member 31 is pulled by a large force in a direction away from the interruption member body 29 and the narrow diameter section 33 ruptures. Therefore, the power transmission between the belt pulley 13 and the rotating shaft 19 is interrupted, so that breakage of the belt and resulting damage of the engine can be prevented.

The torque limiter as described above has advantages that it is not sensitive to fatigue, etc., but it has a problem that variation of working torque at which power transmission between the belt pulley 13 and the rotating shaft 19 is interrupted is excessive.

The working torque is determined by a coefficient of friction between thread surfaces, and dimensional accuracy and material strength of the narrow diameter section. In particular, the material strength of the narrow diameter section varies significantly depending on production lots and manufacturers. Therefore, a tolerance range of the working torque of the torque limiter has to be set rather wide, for example, to 50-120 Nm and the like.

A lower limit of the tolerance range of the working torque has to be larger than the maximum torque under normal operation of the compressor, however, in order to protect the driving belt and prevent engine stall, its upper limit has to be smaller than a torque value at which the belt slips and the engine stalls.

In addition, with reference to FIGS. 4, 4a and 4b, the spacer 93 serves as a first abutment section that faces toward the rotating shaft body 47 and abuts against the stepped surface 65, which may be referred to herein as a first stepped section. The hub 75, or wheel, includes the first inner circumferential surface 103 and a second stepped section 103a formed between the first inner circumferential surface 103 and a second inner circumferential surface 103b. The second inner circumferential surface 103b has a diameter larger than that of the first inner circumferential surface 103.

Further, with reference to FIGS. 4, 4a and 4b, the tubular member 81 includes the first outer circumferential surface 105 and a second abutment section 105a, which is formed between the first outer circumferential surface 105 and a second outer circumferential surface 105b. The first outer circumferential surface 105 is press-fitted into the first inner circumferential surface 103, and the second abutment section abuts against the second stepped section.

However, in recent years, measures for cost reduction, such as reduction of the number of pistons and the like in the compressor are taken, and as a result, fluctuations in driving torque tend to increase. On the other hand, tension on the driving belt is reduced for fuel consumption, and as a result, belt slip tends to decrease.

If the tolerance range of the working torque cannot be set narrow, it is impossible to incorporate the torque limiter into an automobile. Therefore, it is desirable to implement a torque limiter in which the variation of the working torque is reduced.

Other examples of the torque limiter described above are shown in Japanese Unexamined Patent Publications No. 2003-206950 and 2003-307265.

SUMMARY OF THE INVENTION

The present invention has been made to solve the problem described above and it is an object of the present invention to provide a power transmission device having a torque limiter that can reduce variation of a working torque.

In order to solve the above problem, a first characteristic of the present invention comprises: a rotating shaft (45) including a rotating shaft body (47), a male thread section (63) formed at a tip of rotating shaft body (47) and having a diameter smaller than that of the rotating shaft body (47), and a stepped section (65) formed between the male thread section (63) and the rotating shaft body (47); a wheel (75) having a through hole (77) formed in the center thereof and through which the male thread section (63) is inserted, an abutment section (93) facing toward the rotating shaft body (47) and abutting against the stepped section (65), and an inner circumferential surface (79, 103) being formed on an inner circumference of the through hole (77); and a tubular member (81) having a female thread section (85) formed on an inner circumference thereof and screwed to the male thread section (63), and an outer circumferential surface (83, 105) formed on an outer circumference thereof and press-fitted into the inner circumferential surface, wherein, when a normal load is applied between the rotating shaft (45) and the wheel (75), due to the fact that the female thread section (85) of the tubular member (81) press-fitted into the inner circumferential surface (79, 103) of the wheel (75) and the male thread section (63) of the rotating shaft (45) are screwed to each other, the abutment section (93) of the wheel (75) is pressed against the stepped section (65) of the rotating shaft (45) so as to transmit rotational torque, and when an excessive load is applied between the rotating shaft (45) and the wheel (75), the wheel (75) rotates with respect to the rotating shaft (45), and due to the fact that the female thread section (85) of the tubular member (81) and the male thread section (63) of the rotating shaft (45) are screwed to each other, the tubular member (81) is pushed toward the rotating shaft body (47) so that the tubular member (81) is withdrawn from the inner circumferential surface (79, 103) of the wheel (75) and power transmission between the rotating shaft (45) and the wheel (75) is interrupted.

Therefore, variation of working torque at which the power transmission is interrupted as described above, and thus, a tolerance range of the working torque, can be reduced in contrast to the case in which the power transmission is interrupted by rupture of a member.

In order to solve the above problem, a second characteristic of the present invention is that the inner circumferential surface (79) of the wheel (75) and the outer circumferential surface (83) of the tubular member (81) are tapered so as to increase their diameters toward the rotating shaft body (47). Therefore, a torque value at which power is interrupted can be easily set by adjusting how much the outer circumferential surface (83) of the tubular member (81) is axially press-fitted into the inner circumferential surface of the wheel (75).

In order to solve the above problem, a third characteristic of the present invention is that the inner circumferential surface (103) of the wheel (75) and the outer circumferential surface (105) of the tubular member (81) are formed to be tubular and to have axially identical diameters. Therefore, because the diameters of the inner circumferential surface and the outer circumferential surface are axially identical, machining can be easier and cost can be reduced.

In order to solve the above problem, a fourth characteristic of the present invention is that the abutment section is press-fitted into the wheel and secured by swaging. Therefore, even after the tubular member is withdrawn from the inner circumferential surface of the wheel, the hub can be prevented from falling off the rotating shaft.

In order to solve the above problem, a fifth characteristic of the present invention is that a stopper section (97) is provided at one end of the male thread section (63) near the stepped section (65) so that the female thread section (85) of the tubular member (81) cannot move further toward the stepped section (65). Therefore, after power is interrupted, the abutment section (93) can be prevented from being sandwiched between the tubular member (81) and the stepped section (65).

In order to solve the above problem, a sixth characteristic of the present invention is that the abutment section (93) is rotatably engaged with the wheel (75). Therefore, even when the abutment section is sandwiched between the stepped surface and the tubular member withdrawn from the inner circumferential surface of the wheel, the wheel can continue to rotate with respect to the rotating shaft and the power interruption state can be maintained.

In order to solve the above problem, a seventh characteristic of the present invention comprises: a driven shaft (135) having a tapered outer circumferential surface (139) formed on an outer circumference of its front end and increasing its diameter toward the front, and a female thread section (137) formed on an inner circumference of the front end; a rotating body (141) having a tapered inner circumferential surface (145) increasing its diameter toward the front, said tapered inner circumferential surface (145) being press-fitted into the tapered outer circumferential surface (139) of the driven shaft so that an inside front end surface (147) is located forward of a front end surface (149) of the driven shaft (135); and a drive shaft (123) having a male thread section (131) formed at its rear end and screwed to the female thread section (137) of the driven shaft (135), and a flange section (129) formed frontward of this male thread section (131), the male thread section (131) being screwed to the female thread section (137) of the driven shaft (135) so that a rear surface of the flange section (129) is pressed against the inside front end surface (147) of the rotating body (141), wherein, when a normal load is applied between the drive shaft (123) and the rotating body (141), due to the fact that the male thread section (131) of the drive shaft (123) and the female thread section (137) of the driven shaft (135) are screwed to each other, the rear surface of the flange section (129) of the drive shaft (123) is pressed against the inside front end surface (147) of the rotating body (141) so as to transmit rotational torque, and when an excessive load is applied between the drive shaft (123) and the rotating body (141), the drive shaft (123) rotates with respect to the driven shaft (135), and due to the fact that the male thread section (131) of the drive shaft (123) and the female thread section (137) of the driven shaft (135) are screwed to each other, the flange section (129) is pushed toward the rotating body (141), so that the press-fit of the tapered inner circumferential surface (145) of the rotating body (141) onto the tapered outer circumferential surface (139) of the driven shaft (135) is released so as to interrupt the power transmission between the drive shaft (123) and the rotating body (141). Therefore, variation of working torque, at which the power transmission is interrupted as described above, and thus, a tolerance range of the working torque, can be reduced in contrast to the case in which the power transmission is interrupted by rupture of a member. Further, the tapered outer circumferential surface and the tapered inner circumferential surface accommodated in the housing are located in a fluid such as a coolant or the like, and therefore, rustproofing or the like is not necessary.

Hereinabove, reference numerals in parentheses affixed to the above means are examples showing correspondence with specific means set forth in the embodiments described below.

The present invention may be more fully understood from the description of the preferred embodiments of the invention, as set forth below, together with the accompanying drawings.

DESCRIPTION OF THE PREFERRED EMBODIMENTS

Hereinafter, the embodiments of the present invention will be described with reference to FIGS. 1-7.

Figure 1:
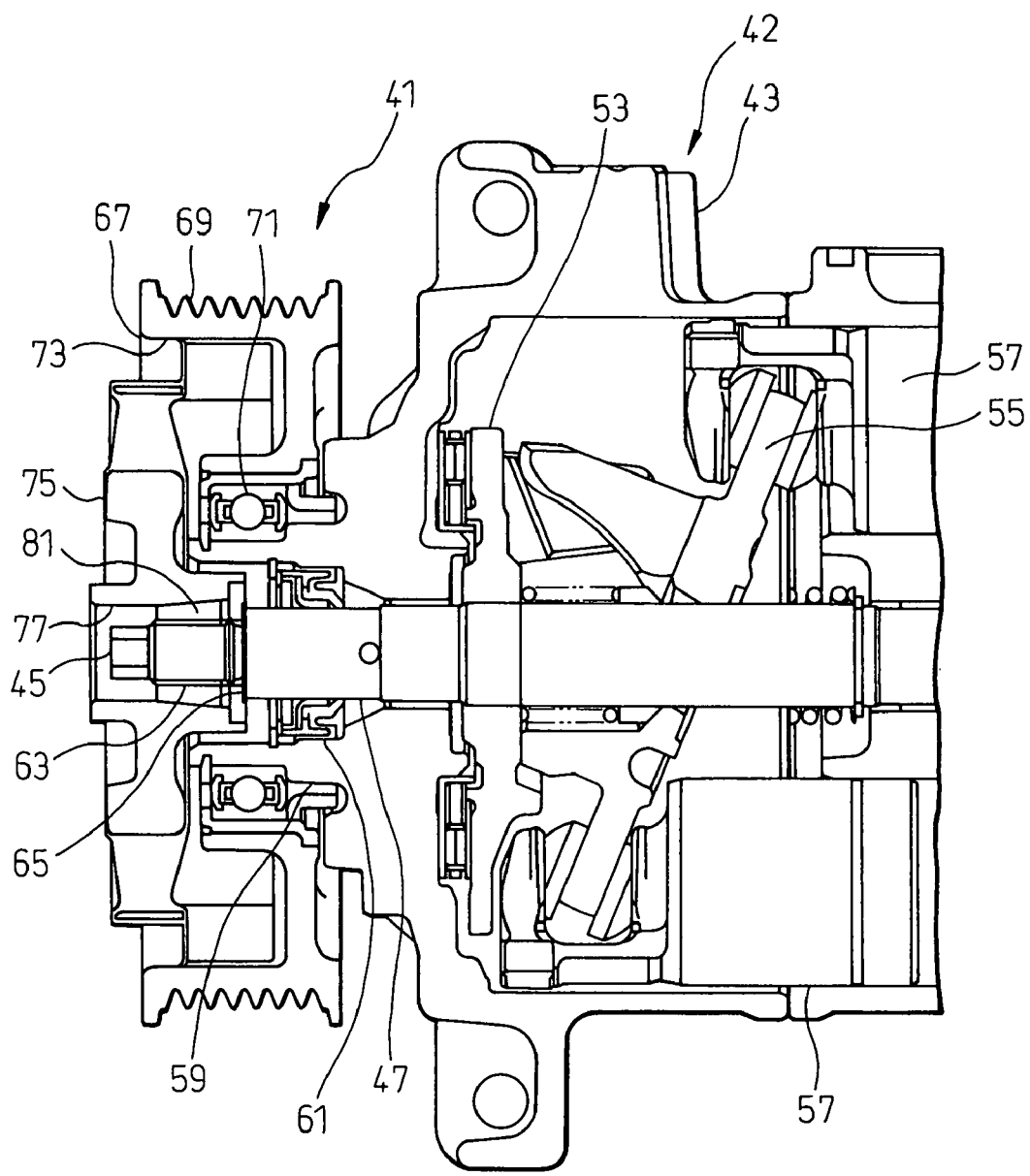
FIG. 1 is a longitudinal cross-sectional view showing a power transmission device that is a first embodiment of the present invention.
Figure 2:
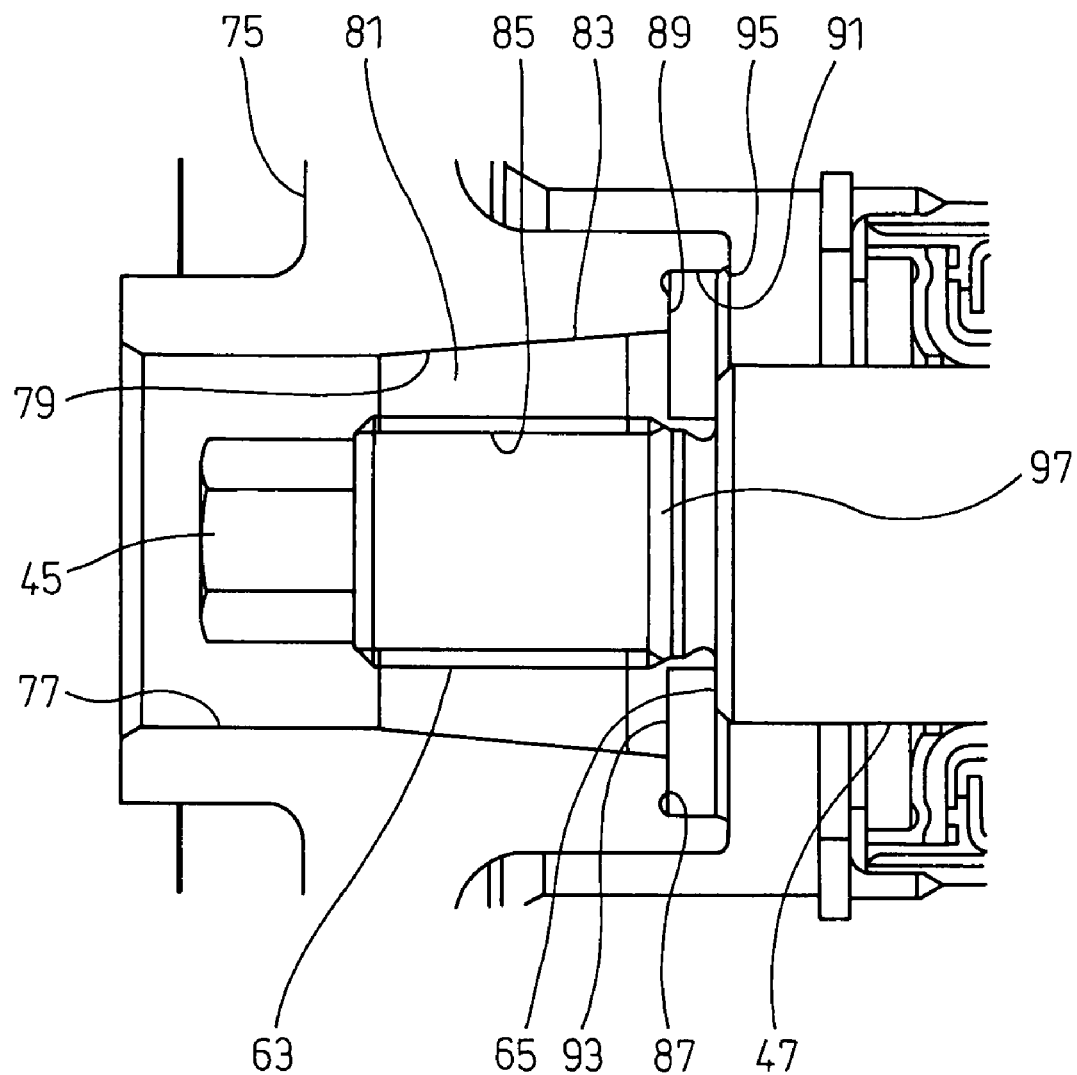
FIG. 2 is a main part cross-sectional view showing a main part of the power transmission device shown in FIG. 1.
Figure 3:
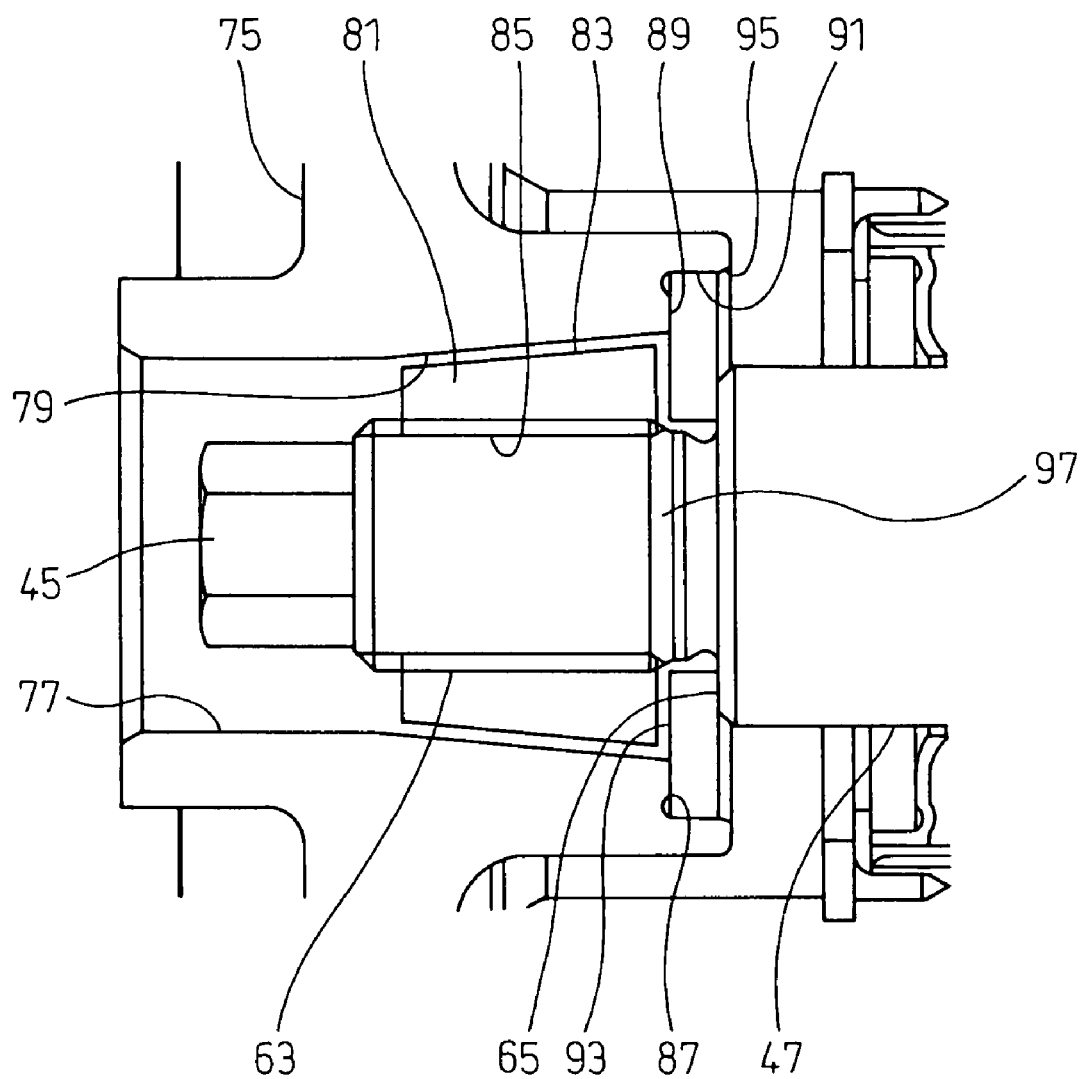
FIG. 3 is a main part cross-sectional view showing a state in which power is interrupted in the power transmission device shown in FIG. 1.

FIGS. 1 and 3 show a power transmission device 41 that is a first embodiment of the present invention. In these figures, a reference numeral 42 denotes a swash plate compressor and this compressor 42 has a case 43. In this case 43, a rotating shaft body 47 of a rotating shaft 45 is supported by bearings 49 and 51. A lug plate 53 and a swash plate 55 are mounted on the rotating shaft body 47, so that the rockingly rotating swash plate 55 drives a piston 57 to discharge fluid.

A tubular bearing support section 59 is provided at the front of the case 43 described above. The bearing 49 described above is disposed at the inner circumferential side of this tubular bearing support section 59 and, at the front of the bearing 49, a lip seal 61 is provided between the bearing support section 59 and the rotating shaft body 47. A right hand male thread section 63 having a diameter smaller than that of this rotating shaft body 47 is coaxially provided at a tip of this rotating shaft body 47. Further, a stepped surface 65 is formed between this right hand male thread section 63 and the rotating shaft body 47.

On the other hand, a rotating body 67 is disposed around an outer circumference of this bearing support section 59 and this rotating body 67 has a pulley 69. This pulley 69 is rotatably provided on the bearing support section 59 via a bearing 71 and receives power from an engine by means of a belt (not shown). A recess 73 is formed on a side of this pulley 69 and a hub 75 is fitted and secured to the recess 73 via an elastic member. This hub 75 has a through hole 77 into which the male thread section 63 of the rotating shaft 45 is inserted, and a tapered inner circumferential surface 79 that increases its diameter toward the rotating shaft body is formed at a portion of the through hole 77 opposed to the male thread section 63. A tubular member 81 is disposed between this tapered inner circumferential surface 79 and the male thread section 63. A tapered outer circumferential surface 83 that increases its diameter toward the rotating shaft body 47 is formed on an outer circumference of this tubular member 81 and press-fitted into the tapered inner circumferential surface 79 of the hub 75. Further, a female thread section 85 that is screwed to the male thread section 63 is formed on an inner circumference of the tubular member 81.

A spacer accommodation recess 87 is formed at one end of the through hole 77 near the rotating shaft body 47. This spacer accommodation recess 87 has an abutment surface 89 facing toward the stepped surface 65, and an inner circumferential surface 91 facing toward inward. Then, an annular spacer 93 is fitted to this spacer accommodation recess 87. This spacer 93 abuts against the abutment surface 89 of the spacer accommodation recess 87 which is pressed inside the inner circumferential surface 91 and is secured by swaging an end 95 of the inner circumferential surface 91 near the rotating shaft body 47. On the other hand, an incomplete thread section 97 is formed at one end of the male thread section 63 near rotating shaft body 47, so that even when the tubular member 81 moves toward rotating shaft body 47, the tubular member 81 cannot move further than this incomplete thread section 97 toward the rotating shaft body 47.

In this configuration, when a normal load is applied between the pulley 69 and the rotating shaft 45, due to the fact that the female thread section 85 of tubular member 81 press-fitted into the tapered inner circumferential surface 79 of the hub 75 and the male thread section 63 of the rotating shaft 45 are screwed to each other, the spacer 93 secured to the spacer accommodation recess 87 of the hub 75 is pressed against the stepped surface 65 of the rotating shaft 45 so as to transmit rotational torque from the pulley 69 to the rotating shaft 45.

For example, when piston 57 of the compressor 42 is locked and an excessive load is applied between the pulley 69 and the rotating shaft 45, the hub 75 rotates with respect to the rotating shaft 45, and due to the fact that the female thread section 85 of the tubular member 81 and the male thread section 63 of the rotating shaft 45 are screwed to each other, the tubular member 81 is pushed toward the rotating shaft body 47 so that the tubular member 81 is withdrawn from the tapered inner circumferential surface 79 of the hub 75 as shown in FIG. 3. As a result, the pressing force of the spacer 93 secured to the hub 75 to the stepped surface 65 ceases to exist and the power transmission between the rotating shaft 45 and the pulley 69 is interrupted.

Here, due to the fact that the female thread section 85 of the tubular member 81 and the male thread section 63 are screwed to each other, the tubular member 81 withdrawn from the tapered inner circumferential surface 79 of the hub 75 moves toward the stepped surface 65. However, the tubular member 81 is blocked by the incomplete thread section 97 formed at the one end of the male thread section 63 near the stepped surface 65, and therefore, the tubular member 81 cannot move further toward the stepped surface 65. Therefore, spacer 93 is prevented from being sandwiched between the tubular member 81 and the stepped surface 65 and the power transmission can be restarted.

Further, due to the fact that the spacer 93 is secured by swaging the hub 75, even after the tubular member 81 is withdrawn from the tapered inner circumferential surface 79 of the hub 75, the tubular member 81 is engaged with the spacer 93, and therefore, the hub 75 can be prevented from falling off the rotating shaft 45.

As described above, in this power transmission device 41, the tapered inner circumferential surface 79 that increases its diameter toward the rotating shaft body 47 is formed on the hub 75, and the tapered outer circumferential surface 83 that increases its diameter toward the rotating shaft body 47 is formed on the tubular member 81 and press-fitted into the tapered inner circumferential surface 79 of the hub 75. When the normal load is applied between the rotating shaft 45 and the pulley 69, due to the fact that the female thread section 85 of the tubular member 81 and the male thread section 63 of the rotating shaft 45 are screwed to each other, the spacer 93 is pressed against the stepped surface 65 to transmit the rotational torque. On the other hand, when the excessive load is applied between the rotating shaft 45 and the pulley 69, the hub 75 rotates with respect to the rotating shaft 45, and due to the fact that the female thread section 85 of the tubular member 81 and the male thread section 63 of the rotating shaft 45 are screwed to each other, the tubular member 81 is pushed toward the rotating shaft body 47 and the tubular member 81 is withdrawn from the tapered inner circumferential surface 79 of the hub 75 so that the power transmission between the rotating shaft 45 and the pulley 69 is interrupted. Therefore, variation of working torque at which the power transmission is interrupted as described above, and thus, the tolerance range of the working torque, can be reduced, in contrast to the case in which the power transmission is interrupted by rupture of a member.

Further, the incomplete thread section 97 is formed at the one end of the male thread section 63 near the stepped surface 65. Therefore, even though the tubular member 81 withdrawn from the tapered inner circumferential surface 79 of the hub 75 moves toward the stepped surface 65, the tubular member 81 cannot move further toward the stepped surface 65. Therefore, the spacer 93 is prevented from being sandwiched between the tubular member 81 and the stepped surface 65 and the power transmission can be restarted.

Still further, due to the fact that the spacer 93 is secured by swaging the hub 75, even after the tubular member 81 is withdrawn from the tapered inner circumferential surface 79, the hub 75 can be prevented from falling off the rotating shaft 45.

Figure 4:
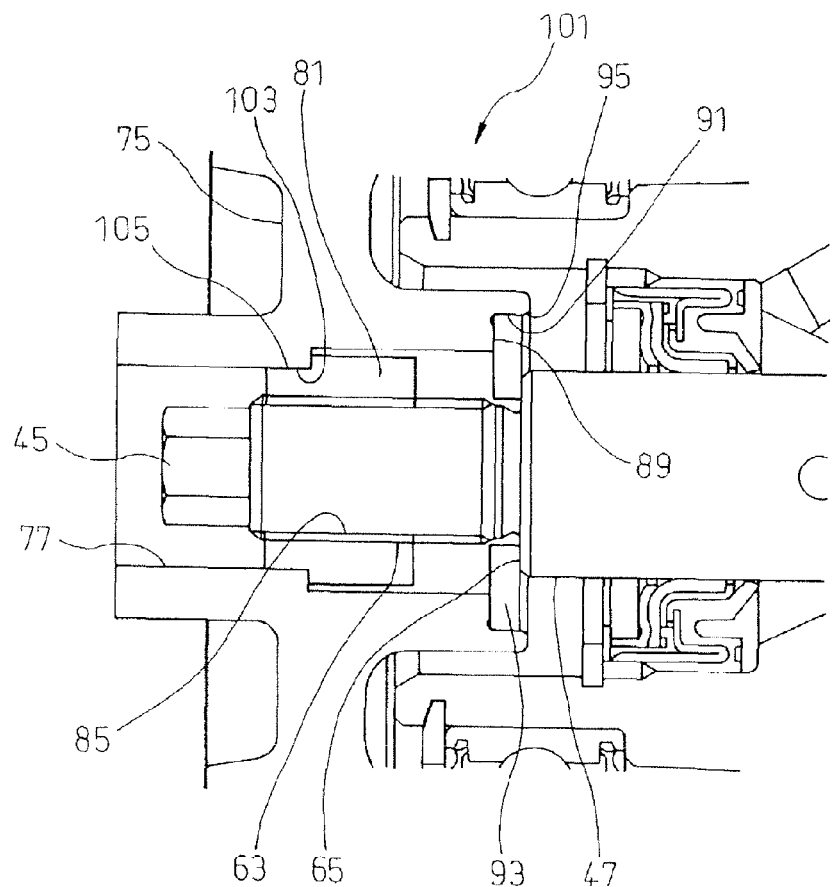
FIG. 4 is a main part cross-sectional view showing a power transmission device that is a second embodiment of the present invention.
Figure 4A:
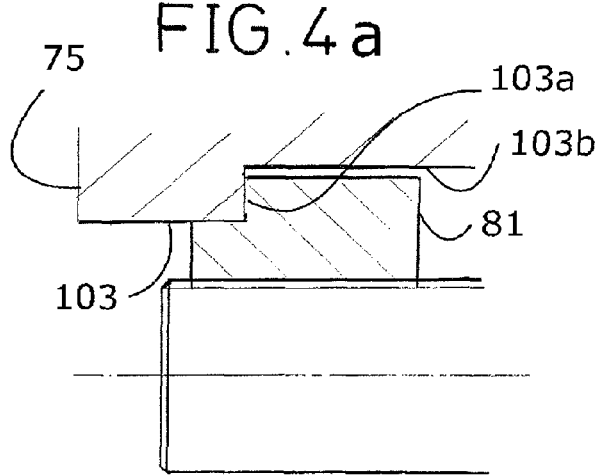
FIG. 4a is a partial diagrammatic view, partly in cross-section, of the power transmission device of FIG. 4.
Figure 4B:
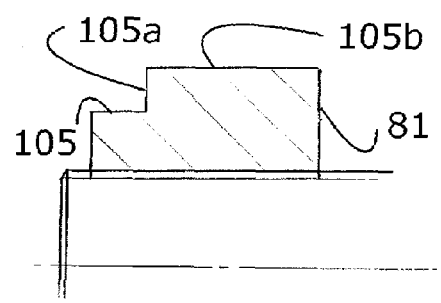
FIG. 4b is a partial diagrammatic view, partly in cross-section, of the power transmission device of FIG. 4.
Figure 5:
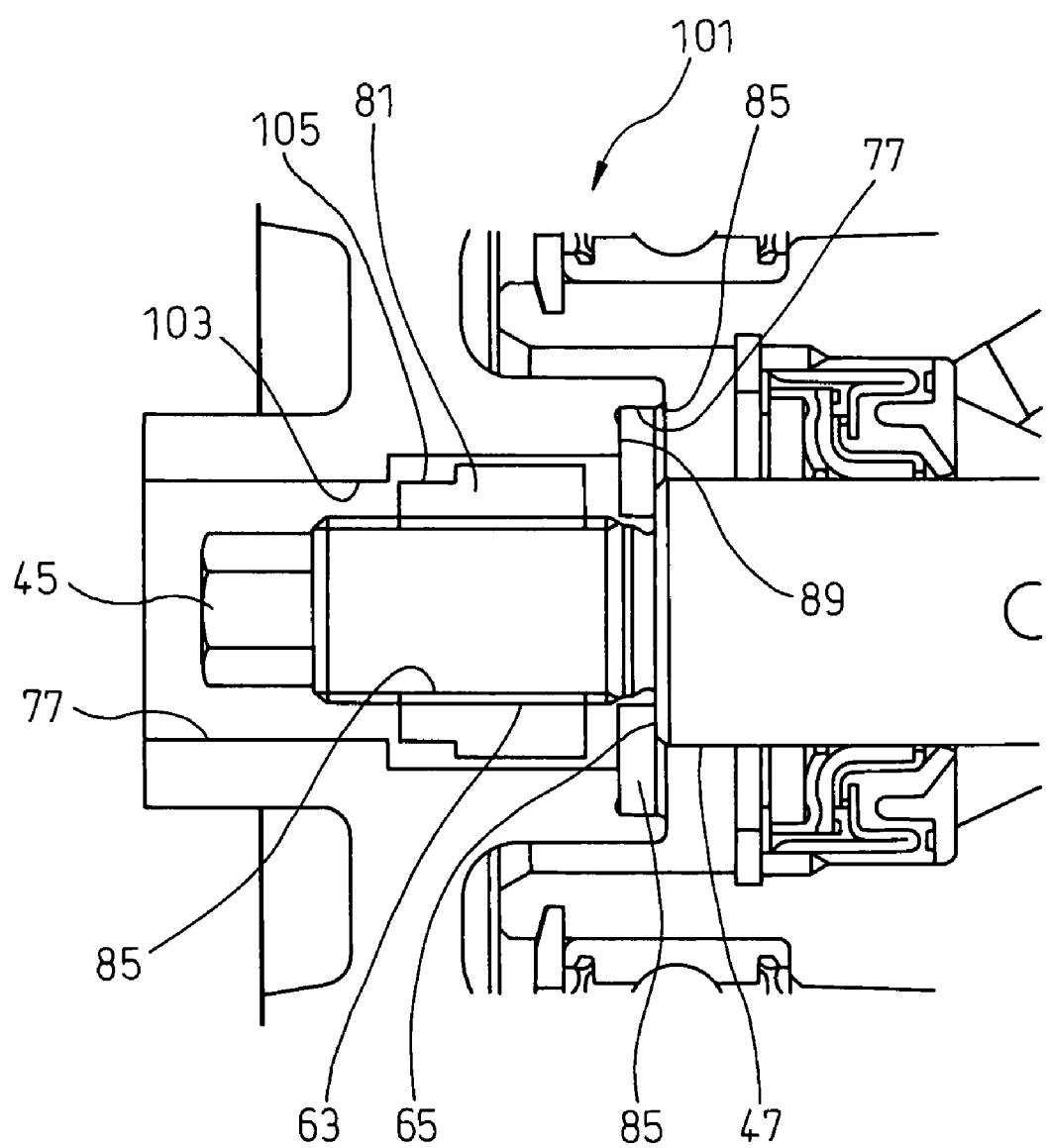
FIG. 5 is a main part cross-sectional view showing a state in which power is interrupted in the power transmission device shown in FIG. 4.

Next, a power transmission device 101 of a second embodiment of the present invention will be described with reference to FIGS. 4a, 4b, and 5. Here, the description of the elements configured identically to the power transmission device 41 of the first embodiment will be omitted and only the elements configured differently will be described.

In this power transmission device 101, a first inner circumferential surface 103, which has an axially uniform inner diameter, is formed in the through hole 77 of the hub, or wheel, 75, and a first outer circumferential surface 105, which has an axially uniform outer diameter, is formed on the outer circumference of the tubular member 81, and the tubular member 81 is press-fitted into the inner circumferential surface 103 of the hub 75. Here, a cross-sectional shape of the first inner circumferential surface 103 and the first outer circumferential surface 105 may not only be circular, but also can be polygonal. Further, press-fit load is adjusted by a press-fit margin.

Thus, this power transmission device 101 can also exhibit effects similar to those of the power transmission device 41. When a normal load is applied between the rotating shaft 45 and the pulley 69, as shown in FIG. 4, due to the fact that the female thread section 85 of the tubular member 81 and the male thread section 63 of the rotating shaft 45 are screwed to each other, the spacer 93 is pressed against the stepped surface 65 so as to transmit the rotational torque. On the other hand, when an excessive load is applied between the rotating shaft 45 and the pulley 69, as shown in FIG. 5, the hub 75 rotates with respect to the rotating shaft 45 and, due to the fact that the female thread section 85 of the tubular member 81 and the male thread section 63 of the rotating shaft 45 are screwed to each other, the tubular member 81 is pushed toward the rotating shaft body 47 and the tubular member 81 is withdrawn from the inner circumferential surface 103 of the hub 75 so that the power transmission between the rotating shaft 45 and the pulley 69 is interrupted. Therefore, variation of working torque at which the power transmission is interrupted as described above, and thus, the tolerance range of the working torque, can be reduced in contrast to the case in which the power transmission is interrupted by rupture of a member. Further, the diameters of both the inner circumferential surface 103 and the outer circumferential surface 105 may be axially identical, and therefore, machining can be easier and cost can be reduced.

Figure 6:
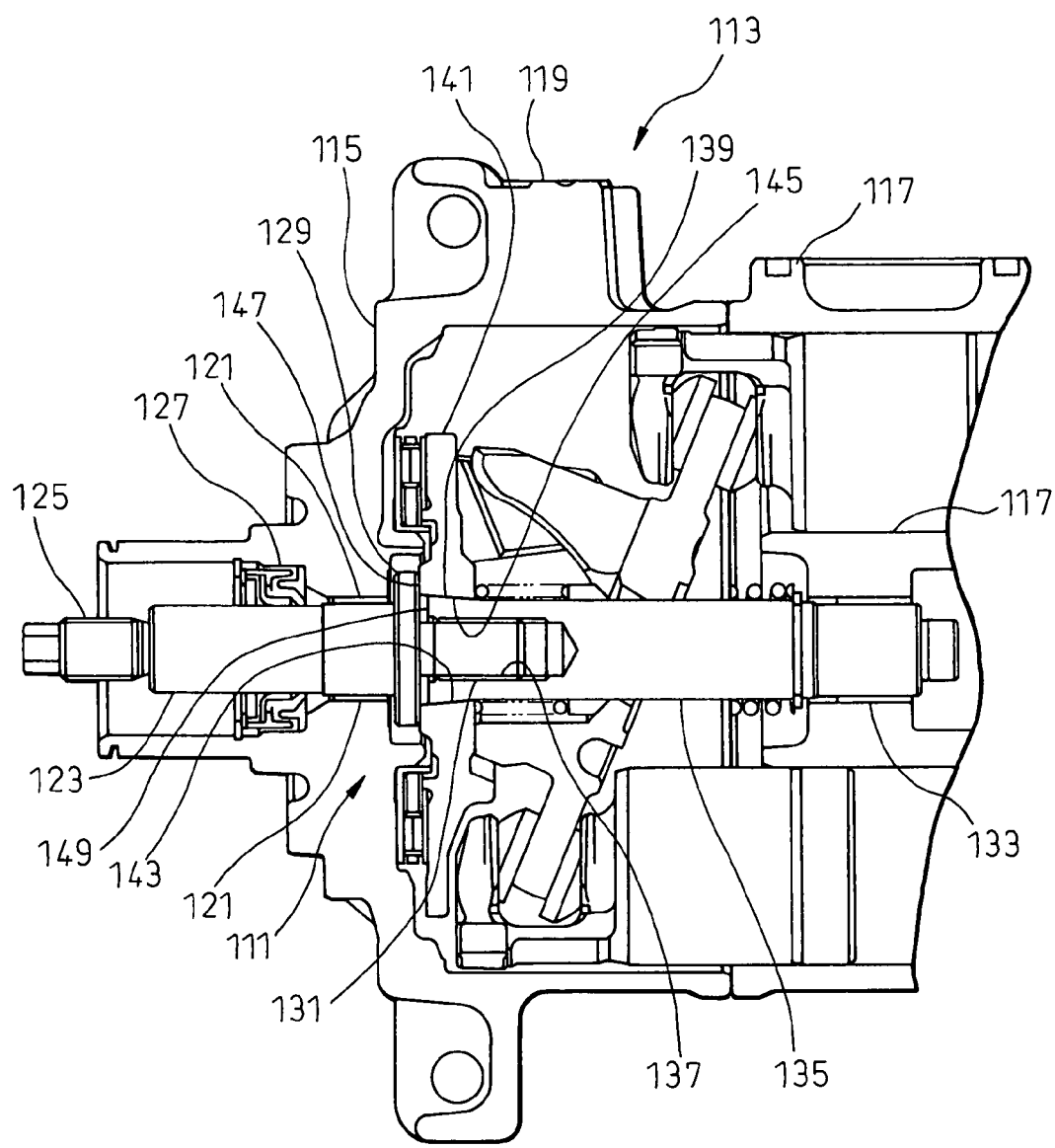
FIG. 6 is a main part cross-sectional view showing a power transmission device that is a third embodiment of the present invention.

Next, a power transmission device 111 of a third embodiment of the present invention will be described with reference to FIGS. 6 and 7. In FIG. 6, a reference numeral 113 denotes a swash plate compressor and has a housing 119 consisting of a front housing 115 and a cylinder block 117. A drive shaft 123 is rotatably supported via a bearing 121 in the center of a front end of the front housing 115. This drive shaft 123 has a male thread section 125 at its front end for fixing a pulley and the like. At an intermediate position between the male thread section 125 and the bearing 121, a lip seal 127 is mounted between the drive shaft 123 and the front housing 115. Further, a flange section 129 having an enlarged diameter is provided rearward of the bearing 121 of this drive shaft 123 or, in other words, inside the housing 119. Then, a connecting male thread section 131 that is used to connect a driven shaft described below is provided rearward from this flange section 129.

On the other hand, in the center of the cylinder block 117, the driven shaft 135 is rotatably supported via a bearing 133 coaxially with the drive shaft 123. A connecting female thread section 137 that is screwed to the connecting male thread section 131 of the drive shaft 123 is formed inside a front end of the driven shaft 135. Further, a tapered outer circumferential surface 139 that increases its diameter toward the front is formed on an outer circumference of a front end of this drive shaft 135.

A disc-shaped lug plate 141 is mounted on this tapered outer circumferential surface 139. This lug plate 141 has a through hole 143 in its center, and a tapered inner circumferential surface 145 that increases its diameter toward the front is formed on an inner circumference of this through hole 143. Then, this tapered inner circumferential surface 145 is sized so that, when it is press-fitted into the tapered outer circumferential surface 139 of the driven shaft 135, an inside front end surface 147 of the lug plate 141 is located forward of the front end surface 149 of the driven shaft 135.

Here, the operations of the drive shaft 123, the driven shaft 135 and the lug plate 141 will be described. First, the driven shaft 135 penetrates through the through hole 143 of the lug plate 141 and the tapered inner circumferential surface 145 of the lug plate 141 is press-fitted into the tapered outer circumferential surface 139 of the driven shaft 135. In this state, the inside front end surface 147 of the lug plate 141 is located forward of the front end surface 149 of the driven shaft 135. Thereafter, the connecting male thread section 131 of the drive shaft 123 is screwed to the connecting female thread section 137 of the driven shaft 135 so that the flange section 129 abuts against the inside front end surface 147 of the lug plate 141.

A swash plate 151 is mounted on the lug plate 141 secured as described above and a piston 153 is slidably coupled with an outer circumference of this swash plate 151.

In this configuration, the lug plate 141, and thus, the swash plate 151 are rotated by rotation applied to the drive shaft 123 from a pulley (not shown) via the male thread section 125, so that the piston 153 is driven to discharge fluid.

In the power transmission device 111 described above, when a normal load is applied between the drive shaft 123 and the lug plate 141, as shown in FIG. 6, due to the fact that the connecting male thread section 131 of the drive shaft 123 and the connecting female thread section 137 of the driven shaft 135 are screwed to each other, a rear surface of the flange section 129 of the drive shaft 123 is pressed against the inside front end surface 147 of the lug plate 141 to transmit the rotational torque.

Figure 7:
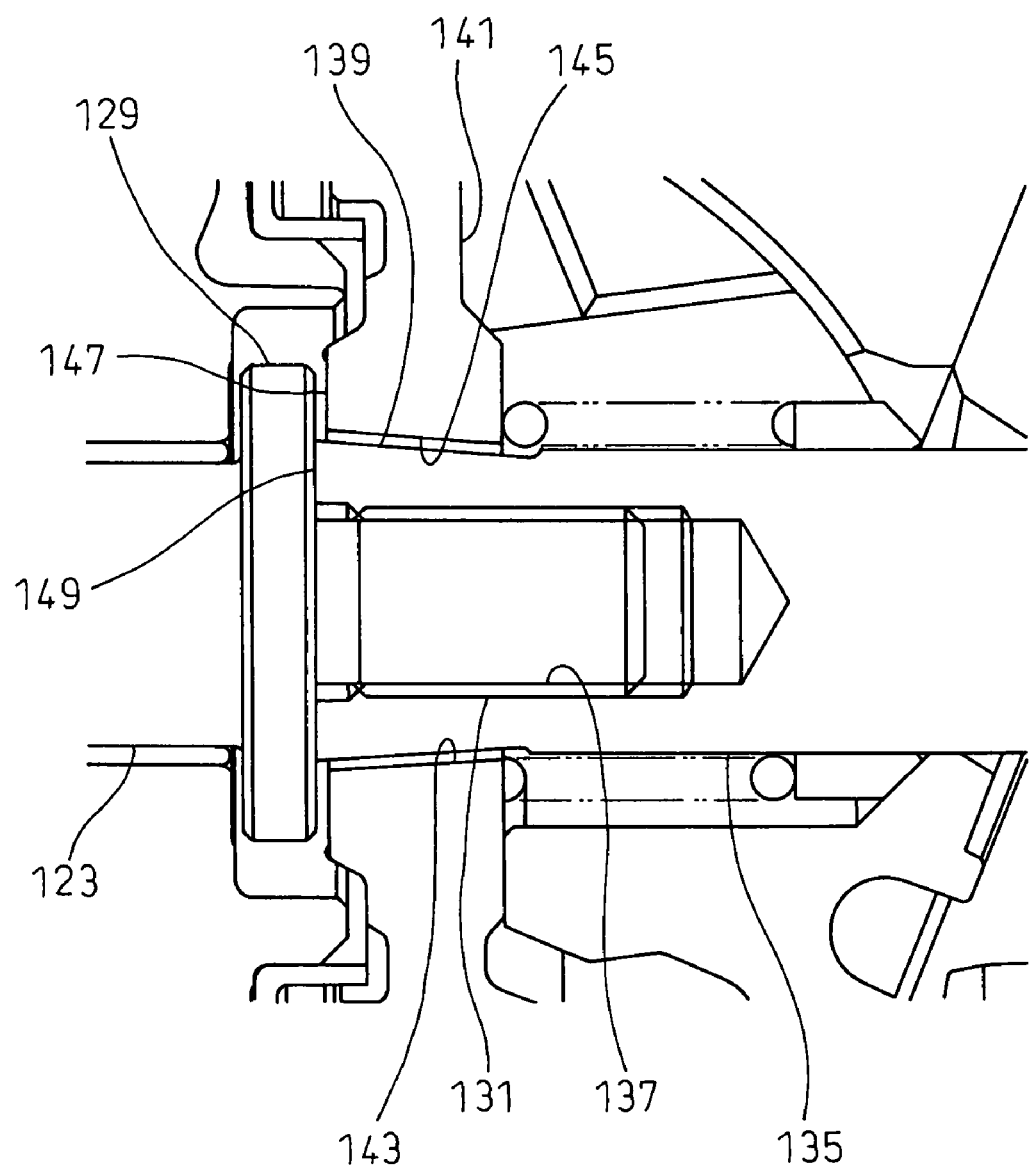
FIG. 7 is a main part cross-sectional view showing a state in which power is interrupted in the power transmission device shown in FIG. 6.
Figure 8:
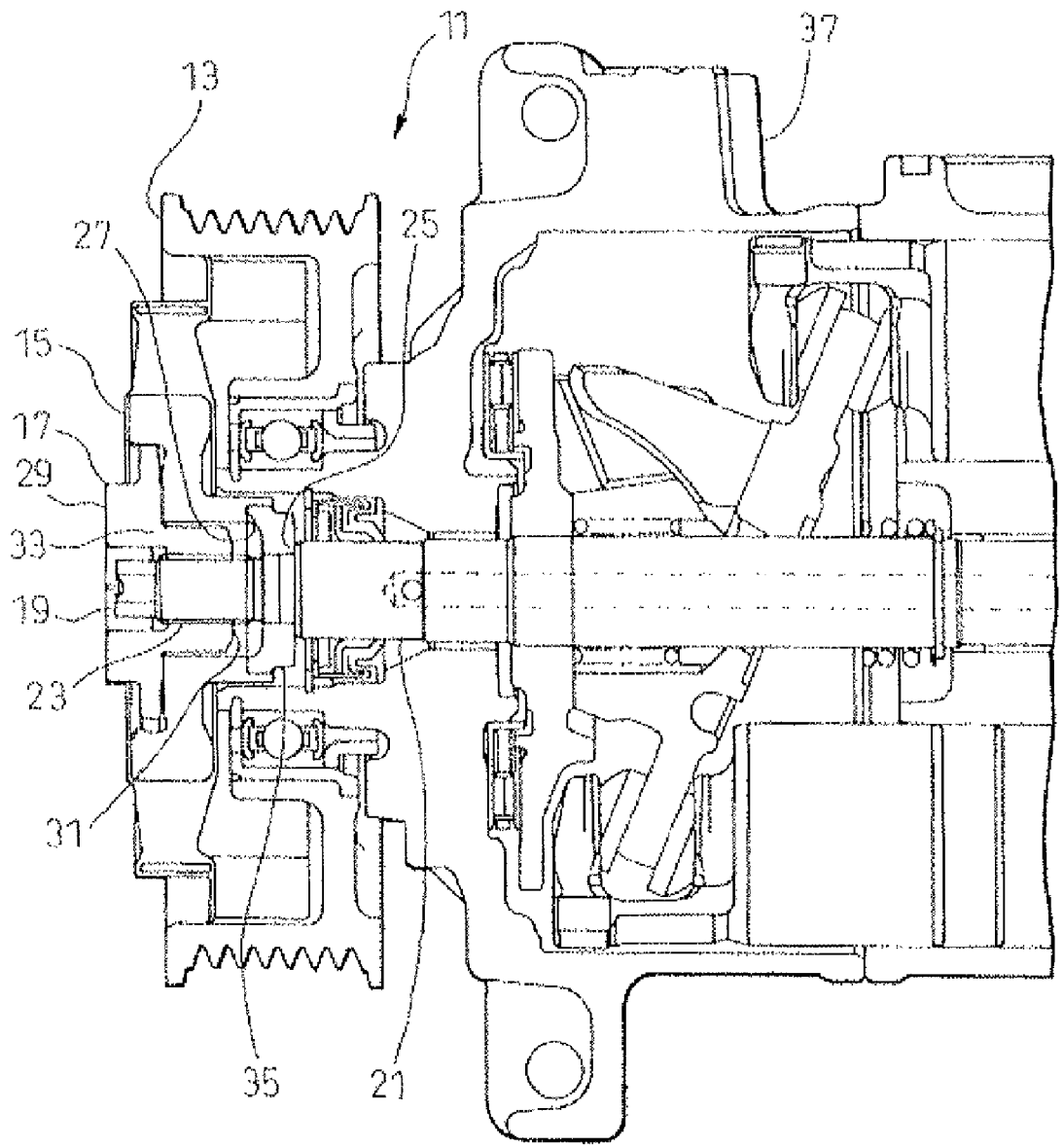
FIG. 8 is a longitudinal cross-sectional view showing a conventional power transmission device.

On the other hand, for example, when the piston 153 is locked and the excessive load is applied between the drive shaft 123 and the lug plate 141, the drive shaft 123 rotates with respect to the driven shaft 135 and, due to the fact that the connecting male thread section 131 of the drive shaft 123 and the connecting female thread section 137 of the driven shaft 135 are screwed to each other, the flange section 129 is firmly pressed against the inside front end surface 147 of the lug plate 141, so that, as shown in FIG. 7, the press-fit of the tapered inner circumferential surface 145 of the lug plate 141 into the tapered outer circumferential surface 139 of the driven shaft 135 is released so as to interrupt the power transmission between the drive shaft 123 and the lug plate 141.

Thus, in this power transmission device 111, the tapered outer circumferential surface 139 that increases its diameter toward the front end is formed on the driven shaft 135, and the tapered inner circumferential surface 145 that increases its diameter toward the front end is formed on the lug plate 141 and press-fitted into the tapered outer circumferential surface 139 of the driven shaft 135. When the normal load is applied between the drive shaft 123 and the lug plate 141, due to the fact that the connecting male thread section 131 of the drive shaft 123 and the connecting female thread section 137 of the driven shaft 135 are screwed to each other, the rear surface of the flange section 129 is pressed against the inside front end surface 147 of the lug plate 141 to transmit the rotational torque. On the other hand, when the excessive load is applied between the drive shaft 123 and the lug plate 141, the drive shaft 123 rotates with respect to the driven shaft 135, and due to the fact that the connecting male thread section 131 of the drive shaft 123 and the connecting female thread section 137 of the driven shaft 135 are screwed to each other, the flange section 129 is firmly pressed against the lug plate 141, so that the press-fit of the tapered inner circumferential surface 145 of the lug plate 141 into the tapered outer circumferential surface 139 of the driven shaft 135 is released so as to interrupt the power transmission between the drive shaft 123 and the lug plate 141. Therefore, variation of working torque at which the power transmission is interrupted as described above, and thus, the tolerance range of the working torque, can be reduced in contrast to the case in which the power transmission is interrupted by rupture of a member. Further, the tapered outer circumferential surface 139 and the tapered inner circumferential surface 145 accommodated in the housing 119 are located in a fluid, such as coolant or the like, and therefore, rustproofing or the like is not necessary.

Though the first to third embodiments have been described above on the assumption that the power transmission device of the present invention is applied to the swash plate compressor, the present invention is not necessarily limited to this application, but may also be applied to other rotary compressors such as a rocking swash plate compressor and so on.

While the invention has been described by reference to specific embodiments chosen for purposes of illustration, it should be apparent that numerous modifications could be made thereto by those skilled in the art without departing from the basic concept and scope of the invention.

The invention claimed is:

1. A power transmission device comprising:
   a rotating shaft including a rotating shaft body, a male thread section formed at a tip of said rotating shaft body and having a diameter smaller than rotating shaft body, and a stepped section formed between male thread section and said rotating shaft body;
   a wheel having a through hole formed in the center thereof and through which said male thread section is inserted, an abutment section facing toward said rotating shaft body and abutting against said stepped section, and an inner circumferential surface being formed on an inner circumference of this through hole; and
   a tubular member having a female thread section formed on an inner circumference thereof and screwed to said male thread section and an outer circumferential surface formed on an outer circumference thereof and press-fitted into said inner circumferential surface,
   wherein, when a normal load, which is less than a load required to cause an interruption of torque in the power transmission device, is applied between said rotating shaft and said wheel, due to the fact that said female thread section of said tubular member press-fitted into said inner circumferential surface of said wheel and said male thread section of said rotating shaft are screwed to each other, the abutment section of said wheel is pressed against the stepped section of said rotating shaft so as to transmit rotational torque and,
   when an excessive load, which is a load that is sufficiently high to cause an interruption of torque in the torque transmission device, is applied between said rotating shaft and said wheel, said wheel rotates with respect to said rotating shaft, and due to the fact that the female thread section of said tubular member and the male thread section of said rotating shaft are screwed to each other, said tubular member is pushed toward said rotating shaft body so that said tubular member is withdrawn from said inner circumferential surface of said wheel and the power transmission between said rotating shaft and said wheel is interrupted.

2. A power transmission device according to claim 1, wherein said inner circumferential surface of said wheel and said outer circumferential surface of said tubular member are tapered so as to increase their diameters toward said rotating shaft body.

3. A power transmission device according to claim 1, wherein said inner circumferential surface of said wheel and said outer circumferential surface of said tubular member are formed to be tubular and to have axially identical diameters.

4. A power transmission device according to claim 1, wherein said abutment section is press-fitted into said wheel and secured by swaging.

5. A power transmission device according to claim 4, wherein a stopper section is provided at one end of said male thread section near said stepped section so that the female thread section of said tubular member cannot move further toward said stepped section.

6. A power transmission device according to claim 1, wherein said abutment section is rotatably engaged with said wheel.

7. A power transmission device comprising: a driven shaft having a tapered outer circumferential surface formed on an outer circumference of its front end and increasing its diameter toward the front, and a female thread section formed on an inner circumference of said front end;
   a rotating body having a tapered inner circumferential surface increasing its diameter toward the front, said tapered inner circumferential surface being press-fitted into said tapered outer circumferential surface of said driven shaft so that an inside front end surface is located forward of a front end surface of said driven shaft; and a drive shaft having a male thread section formed at its rear end and screwed to the female thread section of said driven shaft, and a flange section formed frontward of this male thread section, said male thread section being screwed to the female thread section of said driven shaft so that a rear surface of this flange section is pressed against said inside front end surface of said rotating body, wherein, when a normal load, which is less than a load required to cause an interruption of torque in the power transmission device, is applied between said drive shaft and said rotating body, due to the fact that said male thread section of said drive shaft and said female thread section of said driven shaft are screwed to each other, the rear surface of said flange section of said drive shaft is pressed against said inside front end surface of said rotating body so as to transmit rotational torque and, when an excessive load, which is a load that is sufficiently high to cause an interruption of torque in the torque transmission device, is applied between said drive shaft and said rotating body, said drive shaft rotates with respect to said driven shaft and, due to the fact that the male thread section of said drive shaft and the female thread section of said driven shaft are screwed to each other, said flange section is pushed toward said rotating body, so that the press-fit of the tapered inner circumferential surface of said rotating body onto the tapered outer circumferential surface of said driven shaft is released so as to interrupt the power transmission between said drive shaft and said rotating body.

8. A power transmission device comprising:
a rotating shaft including a rotating shaft body, a male thread section formed at a tip of said rotating shaft body and having a diameter smaller than rotating shaft body, and a first stepped section formed between male thread section and said rotating shaft body;
a wheel including
    a through hole formed in the center thereof and through which said male thread section is inserted,
    a first abutment section, which faces toward said rotating shaft body and abuts against said first stepped section,
    a first inner circumferential surface and a second inner circumferential surface which are formed on an inner circumference of the through hole, wherein said second inner circumferential surface has a diameter larger than that of said first inner circumferential surface, and
    a second stepped section being formed between said first inner circumferential surface and said second inner circumferential surface; and
a tubular member including
    a female thread section formed on an inner circumference of the tubular member and screwed to said male thread section,
    a first outer circumferential surface and a second outer circumferential surface formed on an outer circumference of the tubular member, wherein said first outer circumferential surface is press-fitted into said first inner circumferential surface, and
    a second abutment section formed between said first outer circumferential surface and said second outer circumferential surface and abutting against said second stepped section, wherein, when a normal load, which is less than a load required to cause an interruption of torque in the power transmission device, is applied between said rotating shaft and said wheel, due to the fact that said female thread section of said tubular member, which is press-fitted into said first inner circumferential surface of said wheel, and said male thread section of said rotating shaft are screwed to each other, said first abutment section of said wheel is pressed against said first stepped section of said rotating shaft, and said second abutment section of said tubular member is pressed against said stepped section of said wheel so as to transmit rotational torque and, when an excessive load, which is a load that is sufficiently high to cause an interruption of torque in the torque transmission device, is applied between said rotating shaft and said wheel, said wheel rotates with respect to said rotating shaft, and due to the fact that the female thread section of said tubular member and the male thread section of said rotating shaft are screwed to each other, said tubular member is pushed toward said rotating shaft body so that said tubular member is withdrawn from said first inner circumferential surface of said wheel and the power transmission between said rotating shaft and said wheel is interrupted.

9. A power transmission device according to claim 8, wherein said second outer circumferential surface has a diameter larger than that of said first outer circumferential surface.

* * * * *